United States Patent
Qiu et al.

(10) Patent No.: US 11,871,796 B2
(45) Date of Patent: Jan. 16, 2024

(54) VOLTAGE OUTPUT CIRCUIT FOR ELECTRONIC CIGARETTE AND ELECTRONIC CIGARETTE USING CIRCUIT

(71) Applicant: Changzhou Patent Electronic Technology Co., ltd, Changzhou (CN)

(72) Inventors: Wei-Hua Qiu, ChangZhou (CN); Kui Liu, ChangZhou (CN)

(73) Assignee: Changzhou Patent Electronic Technology Co., ltd, Changzhou (CN)

( * ) Notice: Subject to any disclaimer, the term of this patent is extended or adjusted under 35 U.S.C. 154(b) by 0 days.

(21) Appl. No.: 18/106,462

(22) Filed: Feb. 6, 2023

(65) Prior Publication Data
US 2023/0180846 A1 Jun. 15, 2023

Related U.S. Application Data

(60) Division of application No. 16/984,902, filed on Aug. 4, 2020, now Pat. No. 11,602,177, which is a
(Continued)

(30) Foreign Application Priority Data

Feb. 9, 2018 (CN) .......................... 201820241963.4

(51) Int. Cl.
*H02M 3/15* (2006.01)
*A24F 40/50* (2020.01)
(Continued)

(52) U.S. Cl.
CPC .......... *A24F 40/50* (2020.01); *H02J 7/00712* (2020.01); *H02M 3/158* (2013.01); *A24F 40/90* (2020.01); *H02J 2310/22* (2020.01)

(58) Field of Classification Search
CPC ...... A24F 40/50; A24F 40/90; H02J 7/00712; H02J 2310/22; H02J 7/0063; H02M 3/158
See application file for complete search history.

(56) References Cited

U.S. PATENT DOCUMENTS

| | | | |
|---|---|---|---|
| 4,771,358 A * | 9/1988 | Millner | H01F 13/006 361/205 |
| 2009/0033293 A1* | 2/2009 | Xing | H02M 3/1588 323/284 |

(Continued)

FOREIGN PATENT DOCUMENTS

| | | |
|---|---|---|
| CN | 202303455 U | 7/2012 |
| CN | 203341005 U | 12/2013 |

(Continued)

*Primary Examiner* — S M Sohel Imtiaz
(74) *Attorney, Agent, or Firm* — ScienBiziP, P.C.

(57) ABSTRACT

A voltage output circuit and an electronic cigarette are provided. The voltage output circuit includes a control chip and a step-down switch chip. When a first switch element turns on, the modulation signal output terminal of the control chip outputs a pulse modulation signal to a first control terminal of the step-down switch chip, and access between a first access terminal and a second access terminal of the step-down switch chip is established, based on the effective pulse modulation signal. The output voltage of the second access terminal is less than a system power voltage. The voltage output circuit and the electronic cigarette outputs the pulse modulation signal to the step-down switch chip by the control chip, and the step-down switch chip outputs a suitable driving voltage to the load, such as a thermal wire, the voltage output circuit with simplified structure is adjustable and improved.

14 Claims, 6 Drawing Sheets

Related U.S. Application Data continuation-in-part of application No. PCT/CN2018/096121, filed on Jul. 18, 2018.

(51) Int. Cl.
  *H02J 7/00* (2006.01)
  *H02M 3/158* (2006.01)
  *A24F 40/90* (2020.01)

(56) References Cited

U.S. PATENT DOCUMENTS

| | | | | |
|---|---|---|---|---|
| 2013/0104916 A1* | 5/2013 | Bellinger | A61M 11/042 | 131/328 |
| 2013/0163293 A1* | 6/2013 | Zou | H02M 3/1588 | 363/37 |
| 2015/0180180 A1* | 6/2015 | Kim | H01R 13/7137 | 439/620.08 |
| 2015/0188348 A1* | 7/2015 | Yokota | H02J 7/0063 | 320/135 |
| 2017/0215484 A1* | 8/2017 | Xiang | H02J 7/0045 | |
| 2018/0020507 A1* | 1/2018 | Liu | H05B 6/06 | |
| 2019/0082735 A1* | 3/2019 | Phillips | A24F 42/60 | |
| 2021/0209982 A1* | 7/2021 | Fu | G09G 3/3648 | |

FOREIGN PATENT DOCUMENTS

| | | | |
|---|---|---|---|
| CN | 105955094 A | 9/2016 | |
| CN | 205883045 U | 1/2017 | |

* cited by examiner

VOLTAGE OUTPUT CIRCUIT FOR ELECTRONIC CIGARETTE AND ELECTRONIC CIGARETTE USING CIRCUIT

CROSS-REFERENCE TO RELATED APPLICATIONS

This application is a divisional application of U.S. application Ser. No. 16/984,902 filed on Aug. 4, 2020.

FIELD

The subject matter herein generally relates to voltage control, particularly relates to a voltage output circuit for an electronic cigarette and the electronic cigarette itself.

BACKGROUND

In order to improve users experience, electronic cigarettes provide several additional functions besides a smoking function, such as a multimedia browsing function, a touch operation function, a navigation function, and a solar charging function, these additional functions are used for promoting a sale of the electronic cigarettes.

For achieving the additional functions of the electronic cigarette, it is necessary to provide different voltages to different circuits corresponding to the additional functions, especially the atomizing function which is the basic function of the electronic cigarettes and needs to be guaranteed.

The structure of the voltage output circuit in the current electronic cigarettes is complex and does not provide accurate and suitable driving voltages to different circuits corresponding to different additional functions. Thus, there is room for improvement in the art.

BRIEF DESCRIPTION OF THE FIGURES

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides a voltage output circuit with a simple structure providing accurate and suitable voltages to different function circuits.

First Embodiment

Figure 1:
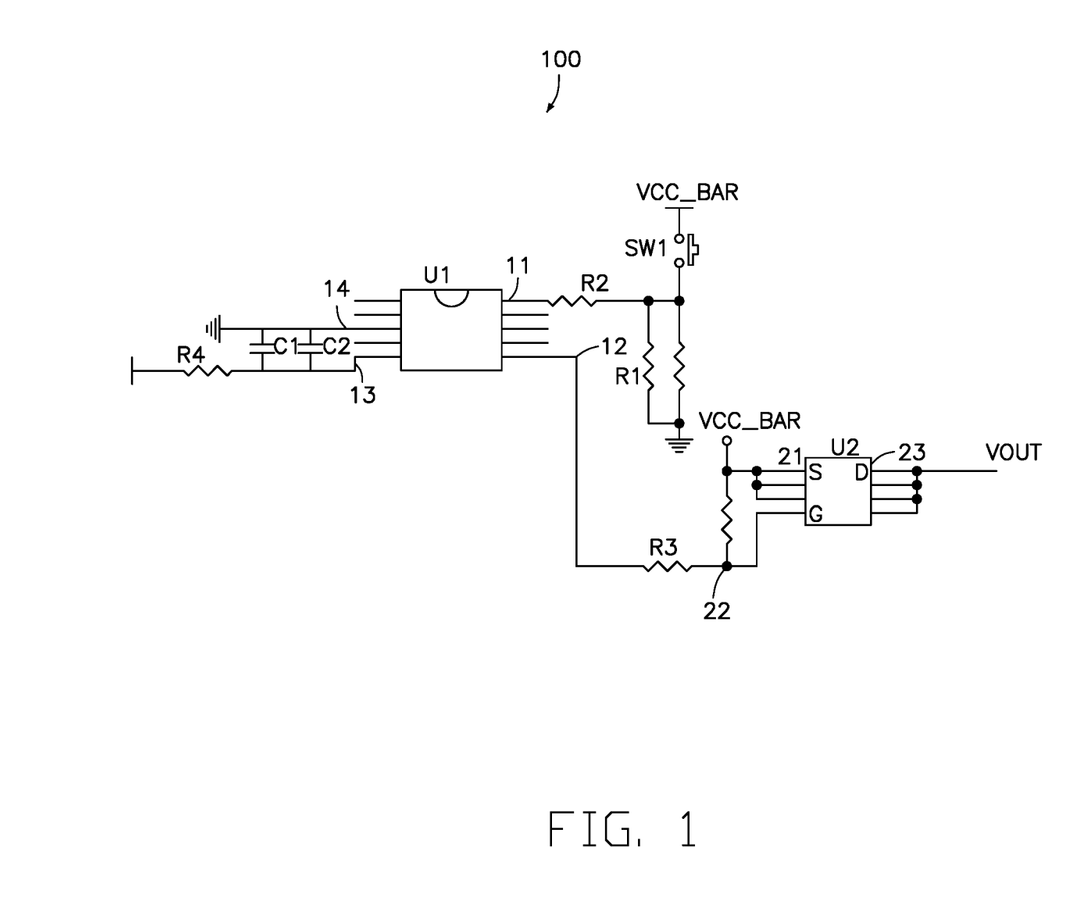
FIG. 1 is a circuit diagram illustrating a first embodiment of a voltage output circuit.

FIG. 1 shows a first embodiment of the voltage output circuit 100. As shown in FIG. 1, the voltage output circuit 100 includes a control chip U1 and a step-down switch chip U2.

In detail, the control chip U1 includes a control signal input terminal 11 and a modulation signal output terminal 12. The control signal input terminal 11 of the control chip U1 is electrically connected with a first switch element, and is grounded through an initial grounded resistor R1. In one embodiment, the first switch element SW1 can be a key, an airflow sensor, and so on. The airflow sensor is used for detecting a suction signal generated by user. When the first switch element SW1 is a key, the control signal input terminal 11 of the control chip U1 receives a system power voltage VCC_BAR through the first switch element SW1. When the key is pressed, the first switch element SW1 turns on, the system power voltage VCC_BAR is applied to the control signal input terminal 11 of the control chip U1, and the control chip U1 outputs a modulation signal to the step-down switch chip U2 through the modulation signal output terminal 12.

In detail, the step-down switch chip U2 includes a first access terminal 21, a first control terminal 22, and a second access terminal 23. The first access terminal 21 of the step-down switch chip U2 receives the system power voltage VCC_BAR, and the first control terminal 22 of the step-down switch chip U2 is electrically connected with the modulation signal output terminal 12 of the control chip U1.

In one embodiment, the control chip U1 can be an N76E003-MSOP10*ICP integrated chip, not being limited thereto. When the control chip U1 is an N76E003-MSOP10*ICP integrated chip, the control signal input terminal 11 is one pin of AIN5/STADC/IC3/PWM3/P0-4 pins of the integrated chip. The modulation signal output terminal 12 is one pin of P0-6/TXD/AIN3 pins of the integrated chip.

In one embodiment, the step-down switch chip U2 is a DTQ3205 integrated chip with positive channel metal oxide semiconductors (PMOSs), not being limited thereto. The first access terminal 21 of the step-down switch chip U2 is a source electrode. The second access terminal 23 of the step-down switch chip U2 is a drain electrode. The first control terminal 22 is a gate electrode. In other embodiments, the step-down switch chip U2 can be other models or other types of the integrated chip.

In detail, when the first switch element SW1 turns on, the control signal input terminal 11 receives a signal in a high voltage level (logic high signal), thus the modulation signal output terminal 12 of the control chip U1 outputs the pulse modulation signal to the first control terminal 22 of the step-down switch chip U2. Access is established between the first access terminal 21 and the second access terminal 23 based on the pulse modulation signal at the first control terminal 22 of the step-down switch chip U2. When the transistor in the step-down switch chip U2 is the PMOS, an effective signal of the pulse modulation signal is a low voltage level (logic low signal). The output voltage VOUT of the second access terminal 23 is less than the system power voltage VCC_BAR.

In one embodiment, the control signal input terminal 11 of the control chip U1 receives the system power voltage VCC_BAR through a first current limiting resistor R2 and the first switch element SW1, and/or the first control terminal 22 of the step-down switch chip U2 is electrically connected with the modulation signal output terminal 12 through a second current limiting resistor R3.

In one embodiment, the control chip U1 can further include a first power receiving terminal 13 and a first ground terminal 14. The first power receiving terminal 13 receives the system power voltage VCC_BAR through a first filter resistor R4, and is further electrically connected with the first ground terminal 14 of the control chip U1 through a first filter capacitor C1 and a second filter capacitor C2, these being electrically interconnected in parallel.

In one embodiment, the first power receiving terminal 13 and the first ground terminal 14 are respectively a VDD pin and a GND pin of the integrated chip in a N76E003-MSOP10*ICP model, not being limited thereto.

In one embodiment, the second access terminal 23 of the step-down switch chip U2 is electrically connected with a thermal wire (not shown), for outputting a driving voltage VOUT, the thermal wire is thus heated by the driving voltage VOUT for operating an atomizing function.

The voltage output circuit 100 in the embodiment provides the pulse modulation signal by the control chip U1 to the step-down switch chip U2, and the step-down switch chip U2 can adjust the driving voltage VOUT based on the pulse modulation signal. Being less than the system power voltage VCC_BAR, the driving voltage VOUT is provided to a load, such as the thermal wire. Thus, the driving voltage VOUT outputted by the voltage output circuit 100 is adjustable, and the structure of the voltage output circuit 100 is made simple by using the control chip U1 and the step-down switch chip U2. In addition, the first limiting resistor R1 and the second limiting resistor R2 serve as current-limiting elements for protecting the voltage output circuit 100 against damage, thus a stability of the voltage output circuit 100 is improved.

Second Embodiment

Figure 2:
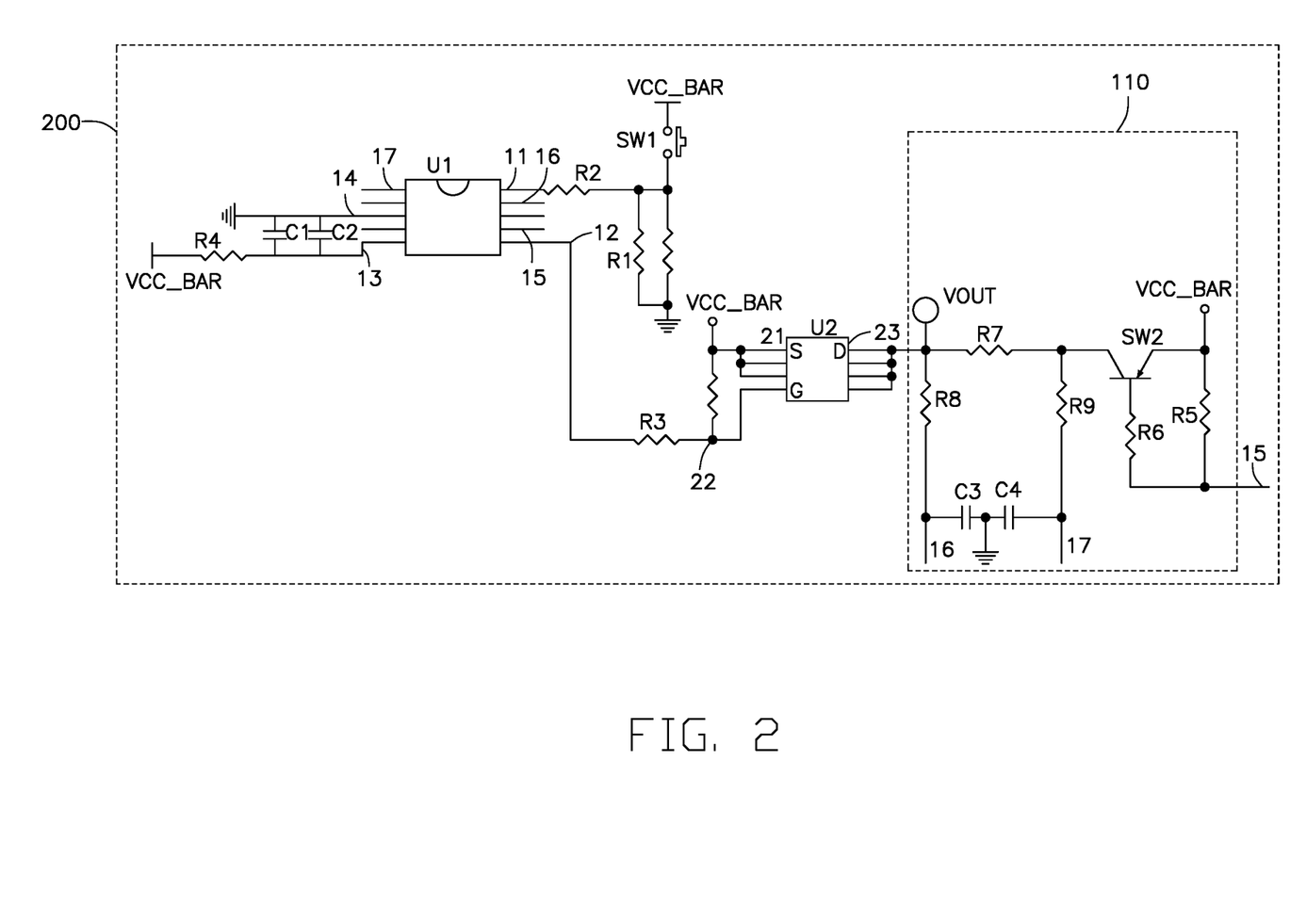
FIG. 2 is a circuit diagram illustrating a second embodiment of a voltage output circuit.

FIG. 2 shows a second embodiment of the voltage output circuit 200. As shown in FIG. 2, the voltage output circuit 200 according to the second embodiment is substantially the same as the voltage output circuit 100 according to the first embodiment, and the difference is the control chip U1. In the second embodiment, the control chip U1 further can include an enable signal detection output terminal 15, a first current receiving terminal 16, and a second current receiving terminal 17. The voltage output circuit 200 of the second embodiment further includes a resistance detection circuit 110. The enable signal detection output terminal 15 is electrically connected with the resistance detection circuit 110.

In one embodiment, the enable signal detection output terminal 15, the first current receiving terminal 16, and the second current receiving terminal 17 are respectively one pin of AIN7/CLO/IC1/PWM1/P1 pins, one pin of AIN6/IC5/PWM5/P0-3 pins, and one pin of P0-6/TXD/AIN3 pins of the integrated chip in an N76E003-MSOP10*ICP model.

The resistance detection circuit 110 can include a third current limiting resistor R5, a fourth current limiting resistor R6, a first detection resistor R7, a second detection resistor R8, a third detection resistor R9, a third filter capacitor C3, a fourth filter capacitor C4, and a second switch element SW2. A third access terminal of the second switch element SW2 receives the system power voltage VCC_BAR and is electrically connected with the enable signal detection output terminal 15 of the control chip U1 through the third current limiting resistor R5. A second control terminal of the second switch element SW2 is electrically connected with the enable signal detection output terminal 15 through the fourth current limiting resistor R6. A fourth access terminal of the second switch element SW2 is electrically connected with the second access terminal 23 through the first detection resistor R7. One terminal of the second detection resistor R8 is grounded through the third filter capacitor C3, and the other terminal of the second detection resistor R8 is electrically connected with the second access terminal 23 of the step-down switch chip U2. One terminal of the third detection resistor R9 is grounded through the fourth filter capacitor C4, and further is electrically connected with the second current receiving terminal 17 of the control chip U1. Another terminal of the third detection resistor R9 is electrically connected with the fourth access terminal of the second switch element SW2.

In one embodiment, the second switch element SW2 is a PNP type transistor. The third access terminal of the second switch element SW2 is an emitter electrode, the second control terminal of the second switch element SW2 is a base electrode, and the fourth access terminal of the second switch element SW2 is a collector electrode. In other embodiments, the second switch element SW2 can be other types of transistor, such as a PMOS transistor.

The operation of the voltage output circuit 200 of this embodiment with the PNP transistor as the second switch element SW2 is as follows. In detail, when the first switch element SW1 turns off, the enable signal detection output terminal 15 of the control chip U1 outputs a logic low signal, the second switch element SW2 turns on. The first current receiving terminal 16 and the second current receiving terminal 17 of the control chip U1 receive the current passing through the second detection resistor R8 and the third detection resistor R9. The control chip U1 calculates a resistance of the thermal wire based on difference in current between the first current receiving terminal 16 and the second current receiving terminal 17.

In one embodiment, the voltage output circuit 200 with the resistance detection circuit 110 can detect a resistance of the thermal wire based on a current difference outputted by the resistance detection circuit 110. Thus, a duty ratio of the pulse modulation signal can be adjusted based on the resistance of the thermal wire for adjusting the driving voltage VOUT provided to the thermal wire, more flexibility of the voltage output circuit 200 is provided.

Third Embodiment

Figure 3:
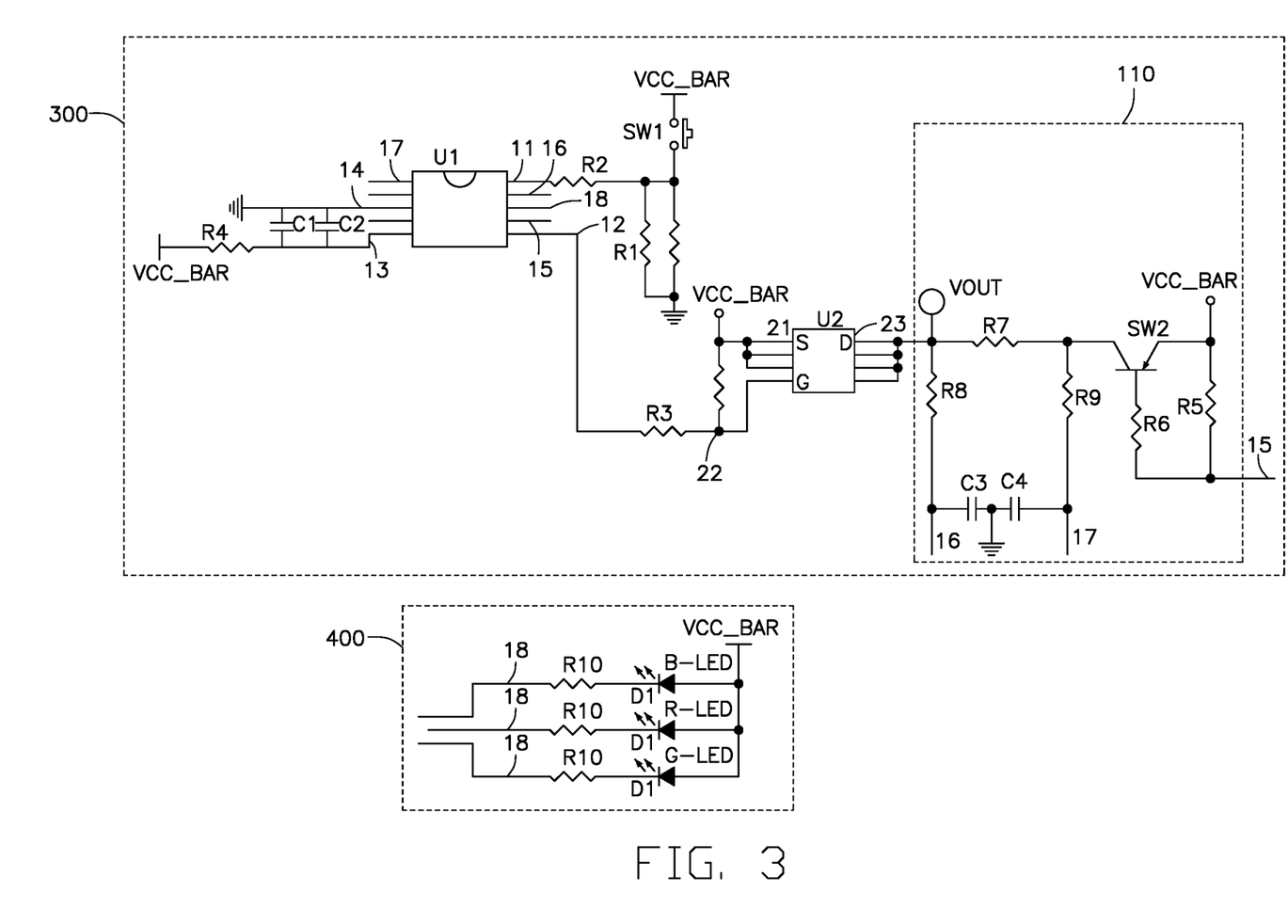
FIG. 3 is a circuit diagram illustrating a third embodiment of a voltage output circuit.

FIG. 3 shows a third embodiment of the voltage output circuit 300. As shown in FIG. 3, the voltage output circuit 300 according to the third embodiment is substantially the same as the voltage output circuit 100 according to the second embodiment, and the difference is the control chip U1. In the third embodiment, the control chip U1 further can include at least one indicator light control terminal 18. In one embodiment, there are three indicator light control terminals in this third embodiment, as shown in FIG. 3. Each indicator light control terminal 18 is electrically connected with an indicator circuit 400.

The indicator circuit 400 includes at least one fifth current limiting resistor R10 and at least one first light emitting diode (LED) D1. A cathode of each LED D1 is electrically connected with one indicator light control terminal 18 through a fifth current limiting resistor R10, and an anode of each LED D1 receives the system power voltage VCC_BAR.

The voltage output circuit 300 in the third embodiment electrically connects with the indicator circuit 400 and controls the LED D1 to be lit through the indicator light control terminal 18 for indicating power of a chargeable battery.

An electronic cigarette with the voltage output circuit 100, or 200, or 300 is also provided.

Figure 4:
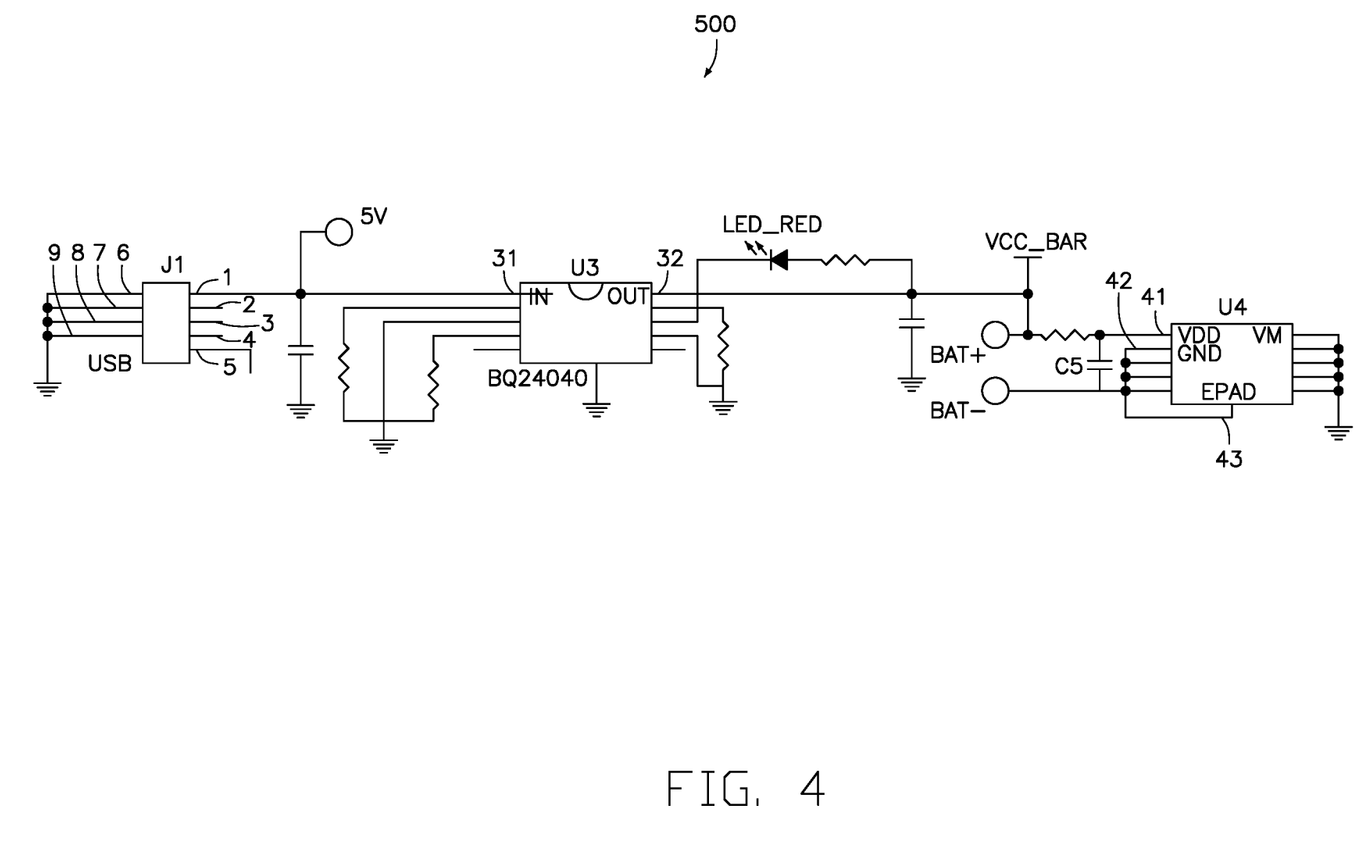
FIG. 4 is a circuit diagram illustrating a first embodiment of an electronic cigarette with the voltage output circuit.

In this embodiment, the electronic cigarette can further include a charging circuit 500. FIG. 4 shows a circuit diagram of the charging circuit 500. As shown in FIG. 4, the charging circuit 500 can include a connector J1 and a charging chip U3.

In detail, the charging chip U3 can include a second power receiving terminal 31 and a charging voltage output terminal 32. The second power receiving terminal 31 is electrically connected with an external power source through the connector J1. The charging voltage output terminal 32 outputs a charging voltage to a positive terminal BAT+ of the chargeable battery.

In one embodiment, the charging chip U3 is a BQ24040 integrated chip, not being limited thereto. The second power receiving terminal 31 and the charging voltage output terminal are the IN pin and OUT pin of the BQ24040 integrated chip.

In one embodiment, the charging circuit 500 can further include a charging protection chip U4. The charging protection chip U4 includes a third power receiving terminal 41, a second ground terminal 42, a heat dissipation lump terminal 43, and a charging detection terminal 44.

In detail, the third power receiving terminal 41 of the charging protection chip U4 is electrically connected with the positive electrode BAT+ of the chargeable battery. The second ground terminal 42 of the charging protection chip U4 is electrically connected with a negative electrode BAT− of the chargeable battery. The heat dissipation lump terminal 43 of the charging protection chip U4 is electrically connected with the second ground terminal 42 of the charging protection chip U4. The charging detection terminal 44 of the charging protection chip U4 is grounded. A size of grounding area of the charging protection chip U4 is larger, thus a current flow capability of the voltage output circuit 100 is improved.

In detail, the charging protection chip U4 protects the chargeable battery from being overcharged, or being short-circuited, or being over-discharged. The second ground terminal 42 of the charging protection chip U4 is electrically connected with the negative electrode BAT− of the chargeable battery, and the charging detection terminal 44 of the charging protection chip U4 is grounded, thus the negative electrode BAT− of the chargeable battery is not connected directly to ground, and the charging protection chip U4 is located between the negative electrode BAT− of the chargeable battery and a system ground. When the chargeable battery needs to be charged or discharged, the negative electrode BAT− of the chargeable battery is electrically connected to the ground through the charging protection chip U4. Thus, the charging protection chip U4 in the voltage output circuit 100 detects the voltage or the current on its own pins or its own elements to determine whether the chargeable battery is in a state of being over-discharged or is being overcharged. When in such states, the connection between the negative electrode BAT− of the chargeable battery and the ground is disconnected for protecting the chargeable battery.

In one embodiment, the second ground terminal 42 of the charging protection chip U4 is electrically connected with one terminal of the fifth filter capacitor C5, and another terminal of the fifth filter capacitor C5 is electrically connected with the negative electrode BAT− of the chargeable battery. The fifth filter capacitor C5 filters the system power voltage VCC_BAR from the positive electrode BAT+ of the chargeable battery.

In one embodiment, the charging protection chip U4 is XB6006A2. As shown in FIG. 4, the third power receiving terminal 41 of the charging protection chip U4 is a VDD terminal, the second ground terminal 42 is a GND terminal, the heat dissipation lump terminal 43 is an EPAD terminal, and the charging detection terminal 44 is a VM terminal.

The electronic cigarette of the embodiment can automatically disconnect the connection between the chargeable battery and the charging chip U3 or between the chargeable battery and a discharging path by the charging protection chip U4. Overcharging and/or over-discharging of the chargeable battery and the electronic cigarette are thus prevented, both the electronic cigarette and the chargeable battery are protected.

The voltage output circuit 100 and the electronic cigarette outputs the pulse modulation signal to the step-down switch chip U2 for controlling the driving voltage VOUT. The driving voltage VOUT provided to the load, such as to the thermal wire as a load, can be lower than the system power voltage VCC_BAR. Thus, the voltage outputted by the voltage output circuit 100 can be adjusted, and the structure of the voltage output circuit 100 is simplified by using the control chip U1 and the step-down switch chip U2.

Fourth Embodiment

Figure 5:
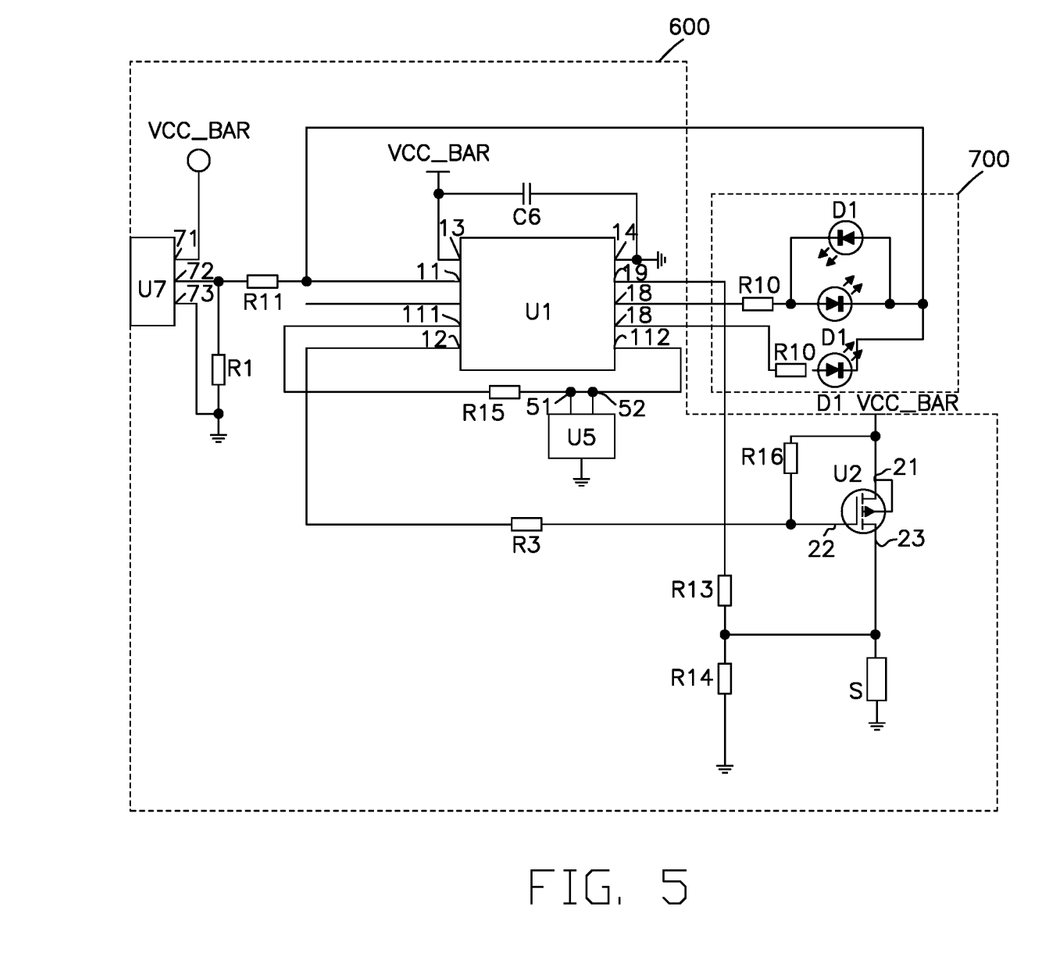
FIG. 5 is a circuit diagram illustrating a fourth embodiment of a voltage output circuit.

FIG. 5 shows a fourth embodiment of the voltage output circuit 600. The control chip U1 in FIG. 5 includes a control signal input terminal 11 and a modulation signal output terminal 12. The control signal input terminal 11 of the control chip U1 is electrically connected with a first switch element SW1, and is grounded through an initial grounded resistor R1. In detail, the control chip U1 further includes a first power receiving terminal 13 and a first grounding terminal 14. The first power receiving terminal 13 is electrically connected with a positive electrode BAT+ of the battery, and receives the system power voltage. The first power receiving terminal 13 is grounded through a sixth filter capacitor C6, and receives a stable voltage. Besides, the first grounding terminal 14 is grounded.

In detail, the step-down switch chip U2 includes a first access terminal 21, a first control terminal 22, and a second access terminal 23. The first access terminal 21 of the step-down switch chip U2 receives the system power voltage VCC_BAR, and the first control terminal 22 of the step-down switch chip U2 is electrically connected with the modulation signal output terminal 12 of the control chip U1.

Optionally, the first control terminal 22 of the step-down switch chip U2 receives the system power voltage through a seventh current limiting resistor R16. The second access terminal 23 of the step-down switch chip U2 is electrically connected with a thermal wire S for outputting a driving voltage to the thermal wire S, and the thermal wire S operates to generate heat.

In one embodiment, the step-down switch chip U2 can be a DTQ3205 integrated chip with positive channel metal oxide semiconductors (PMOSs), not being limited thereto. The first access terminal 21 of the step-down switch chip U2 is a source electrode. The second access terminal 23 of the step-down switch chip U2 is a drain electrode. The first control terminal 22 is a gate electrode. In other embodiments, the step-down switch chip U2 can be other models or other types of the integrated chip.

In one embodiment, the first switch element SW1 is an airflow sensor, such as a microphone. The first switch element SW1 detects a suction signal generated by a user for determining whether the user is drawing on the electronic cigarette. When the suction signal is detected by the airflow sensor, the first switch element SW1 generates an enable signal to the control chip U1.

As shown in FIG. 5, a power terminal 71 of the airflow sensor U7 is electrically connected with a positive electrode BAT+ of the chargeable battery, and is used for receiving the system power voltage VCC_BAR. The control signal input terminal 11 of the control chip U1 is electrically connected with a signal output terminal 72 of the airflow sensor U7 through a sixth current limiting resistor R11, and the signal output terminal 72 of the airflow sensor U7 is grounded through the initial ground resistor R1. A grounding terminal 73 of the airflow sensor U7 is grounded. The initial grounding resistor R1 is used as a pull-down resistor. When the suction action is detected by the airflow sensor U7, the airflow sensor U7 outputs the enable signal to the control signal input terminal 11 of the control chip U1 through the signal output terminal 72. When the control chip U1 receives the enable signal, the control chip U1 outputs the pulse modulation signal to the step-down switch chip U2 through the modulation signal output terminal 12.

In detail, the first control terminal 22 of the step-down switch chip U2 is electrically connected with the modulation signal output terminal 12 of the control chip U1 through a second current limiting resistor R3. The first control terminal 22 of the step-down switch chip U2 receives the system power voltage VCC_BAR through a seventh current limiting resistor R16.

In detail, the second access terminal 23 of the step-down switch chip U2 is electrically connected with a resistance detection terminal 19 of the control chip U1 through a fourth detection resistor R13. The resistance detection terminal 19 is electrically connected with a terminal of a divider resistor R14 through the fourth detection resistor R13. Another terminal of the divider resistor R14 is grounded. The second access terminal 23 of the step-down switch chip U2 is grounded through the divider resistor R14. In one embodiment, the fourth detection resistor R13 and the divider resistor R14 can detects a resistance of the thermal wire, for determining whether the thermal wire S is correctly installed. Optionally, the fourth detection resistor R13 and the divider resistor R14 in the voltage output circuit 600 can be omitted, and the second access terminal 23 of the step-down switch unit U2 is directly connected with the resistance detection circuit 110 of the second embodiment, a current difference outputted by the resistance detection circuit 110 is used for acquiring a resistance of the thermal wire S, and the duty ratio of the pulse modulation signal is adjusted by the resistance of the thermal wire S, the driving voltage VOUT provided to the thermal wire S is adjusted, and more flexibility of the voltage output circuit 600 is improved.

Optionally, the voltage output circuit 600 in the embodiment further includes a voltage stabilizing module U5. A first terminal 51 of the voltage stabilizing module U5 is electrically connected with a voltage output terminal 111 of the control chip U1 through a stabilizing resistor R15. The first terminal 51 of the stabilizing module U5 is electrically connected with a second terminal 52 of the stabilizing module U5. The second terminal 52 of the stabilizing module U5 is electrically connected with a high voltage level input terminal 112 of the control chip U1. The stabilizing module U5 is set in the voltage output circuit 600 in the embodiment to stabilize an internal voltage of the control chip U1 at a predetermined voltage, for preventing the control chip U1 being damaged while operated under an unstable voltage.

Optionally, the control chip U1 further includes at least one indicator light control terminal 18. Each indicator light control terminal 18 is electrically connected with an indicator circuit 700.

The indicator circuit 700 includes at least one fifth current limiting resistor R10 and at least one light emitting diode (LED) D1. A cathode of each LED D1 can be electrically connected with one indicator light control terminal 18 through a fifth current limiting resistor R10. Cathodes of the LED D1 also can be electrically connected with a single indicator light control terminal 18 through a single fifth current limiting resistor R10.

As shown in FIG. 5, there are two indicator light control terminals 18. Each indicator light control terminal 18 is electrically connected with a terminal of the LED D1 through the fifth current limiting resistor R10. Another terminal of the LED D1 is electrically connected with the control signal input terminal 11 of the control chip U1. Optionally, as shown in FIG. 5, the terminals of the two LEDs D1 are electrically connected with the indicator light control terminal 18 of the control chip U1 through a single fifth current limiting resistor R10, other terminals of the two LEDs D1 are electrically connected with the control signal input terminal 11 of the control chip U1. A terminal of a third LED D1 is electrically connected with the adjacent indicator light control terminal 18 of the control chip U1 through a second fifth current limiting resistor R10, other terminal of the third LED D1 is electrically connected with the control signal input terminal 11 of the control chip U1. The three LEDs D1 can be illuminated or be dark under the control of the control signal input terminal 11 and the indicator light control terminal 18.

The voltage output circuit 600 in the embodiment is electrically connected with the indicator circuit 700, and the LEDs D1 are controlled to be illuminated through the indicator light control terminal 18, for indicating the energy of the chargeable battery, for example, a high energy is green light, and a low energy is red light. Besides, the indicator circuit 700 also indicates a current power or an output voltage, for example, a high power is red light, and a low power is green light. The indicator circuit 700 also indicates a drawing (suction) or non-drawing (no suction) state of the user. When the user smokes the electronic cigarette, the LED D1 is illuminated. When the user stops smoking, the LED D1 is dark. In one embodiment, there are LEDs D1 with different colors. A color of the indicator when illuminated of the electronic cigarette is adjusted by controlling one or more of the LEDs D1 with different illumination colors. For example, a displayed color of the indicator when illuminated of the electronic cigarette can be yellow by controlling the illumination, or respective illumination, of the red LED D1 and the green LED D1. The adjusting manner is not limited.

In one embodiment, the second access terminal 23 of the step-down switch chip U2 is electrically connected with the thermal wire S and outputs the driving voltage for driving the thermal wire S to generate heat.

The present disclosure also provide a second embodiment of the electronic cigarette with the voltage output circuit 600.

Figure 6:
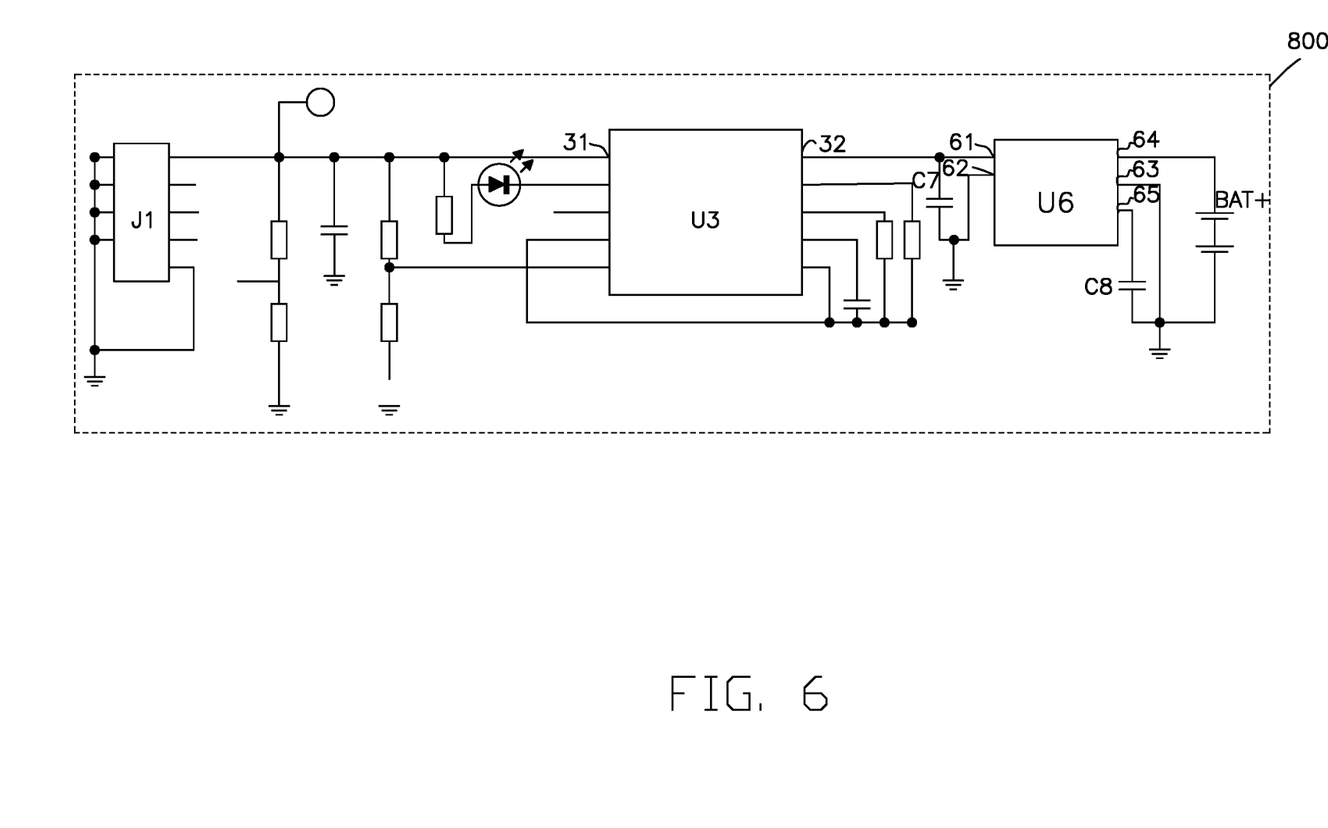
FIG. 6 is a circuit diagram illustrating a second embodiment of an electronic cigarette with the voltage output circuit.

In one embodiment, the electronic cigarette further includes a charging circuit 800. FIG. 6 shows an embodiment of the charging circuit 800. The charging circuit 800 includes a connector J1 and a charging chip U3.

In detail, the charging chip U3 includes a second power receiving terminal 31 and a charging voltage output terminal 32. The second power receiving terminal 31 is electrically connected with an external power source through the connector J1. The charging voltage output terminal 32 outputs a charging voltage to a positive terminal BAT+ of the chargeable battery. In one embodiment, the charging chip U3 is an MP2602 integrated chip, not being limited thereto. The second power receiving terminal 31 and the charging voltage output terminal are the VIN pin and BATT pin of the MP2602 integrated chip.

Optionally, in another embodiment, the charging circuit 800 further includes a battery protection chip U6. The battery protection chip U6 is used for protecting the chargeable battery from being overcharged or being over-discharged. The battery protection chip U6 includes a charging input terminal 61, a third ground terminal 62, a fourth ground terminal 63, a fourth power receiving terminal 64, and an internal power supply terminal 65. In one embodiment, the charging input terminal 61 is electrically connected with charging voltage output terminal 32 of the charging chip U3, and is grounded through a seventh filter capacitor C7 for receiving a stable voltage. The third ground terminal 62 and the fourth ground terminal 63 are grounded. The internal power supply terminal 65 is grounded through an eighth capacitor C8. The fourth power receiving terminal 64 is electrically connected with a positive electrode BAT+ of the chargeable battery. A negative electrode BAT− of the chargeable battery is grounded. Optionally, the battery protection chip U6 is a CT2105 chip, not being limited thereto. When the battery protection chip U6 is the CT2105 chip, the charging input terminal 61 of the battery protection chip U6 is a VM pin, and the third ground terminal 62 and the fourth ground terminal 63 are GND pins. The fourth power receiving terminal 64 is a VDD pin, and the internal power supply terminal 65 is a VCC pin. In one embodiment, when the battery protection chip U6 detects that the chargeable battery is being overcharged or is being over-discharged, the battery protection chip U6 disconnects a connection between the fourth power receiving terminal 64 and the chargeable battery, for disconnecting the chargeable battery from the voltage output circuit 600 and/or the charging circuit 800.

Besides, in one embodiment, the electronic cigarette can include a chargeable battery. In other embodiments, the chargeable battery can be omitted, not being limited thereto. The types of the chargeable battery can be a chargeable or a non-chargeable battery, such as, a lithium battery, an alkaline dry battery, a nickel metal hydride battery, a lead-acid battery, an iron nickel battery, a metal oxide battery, a zinc-silver battery, a zinc-nickel battery, a hydrogen-oxygen fuel battery, and a solar battery.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. An electronic cigarette comprising:
a voltage output circuit; the voltage output circuit comprising:
a control chip with a control signal input terminal and a modulation signal output terminal, the control signal input terminal receives a system power voltage through a first switch element, and is grounded through a first ground resistor; the first switch element configured to generate an enable signal to the control chip when being energized; and
a step-down switch chip with a first access terminal, a first control terminal, and a second access terminal; the first access terminal receives the system power voltage, the first control terminal is connected with the modulation signal output terminal of the control chip;
wherein when the first switch element is energized, the control chip receives the enable signal, and the modulation signal output terminal of the control chip outputs a pulse modulation signal to the first control terminal of the step-down switch chip, and an access is formed between the first access terminal and the second access terminal based on the effective pulse modulation signal at the first control terminal of the step-down switch chip; the output voltage of the second access terminal is less than the system power voltage;
the control chip further comprises a first power receiving terminal and a first ground terminal; the first power receiving terminal receives the system power voltage through a first filter resistor, and is further electrically connected with the first ground terminal through a first filter capacitor and a second filter capacitor, which are electrically connected with each other in parallel.

2. The electronic cigarette of claim 1, wherein the control signal input terminal receives the system power voltage through a first current limiting resistor and the first switch element; the first control terminal is electrically connected with the modulation signal output terminal through a second current limiting resistor.

3. The electronic cigarette of claim 1, wherein the second access terminal of the step-down switch chip is electrically connected with a thermal wire for outputting a driving voltage, which drives the thermal wire to generate heat.

4. The electronic cigarette of claim 3, wherein the control chip further comprises an enable signal detection output terminal, a first current receiving terminal, and a second current receiving terminal; the voltage output circuit further comprises a resistance detection circuit; the enable signal detection output terminal is electrically connected with the resistance detection circuit; the resistance detection circuit comprises a third current limiting resistor, a fourth current limiting resistor, a first detection resistor, a second detection resistor, a third detection resistor, a third filter capacitor, a fourth filter capacitor, and a second switch element; a third access terminal of the second switch element receives the system power voltage, and is electrically connected with the enable signal detection output terminal through the third current limiting resistor; a second control terminal of the second switch element is electrically connected with the enable signal detection output terminal through the fourth current limiting resistor; a fourth access terminal of the second switch element is electrically connected with the second access terminal through the first detection resistor; one terminal of the second detection resistor is grounded through the third filter capacitor, and other terminal of the second detection resistor is electrically connected with the second access terminal; one terminal of the third detection resistor is grounded through the fourth filter capacitor, and further is electrically connected with the second current receiving terminal; other terminal of the third detection resistor is electrically connected with the fourth access terminal of the second switch element.

5. The electronic cigarette of claim 1, wherein the control chip further comprises an enable signal detection output terminal, a first current receiving terminal, and a second current receiving terminal; the voltage output circuit further comprises a resistance detection circuit; the enable signal detection output terminal is electrically connected with the resistance detection circuit; the resistance detection circuit comprises a third current limiting resistor, a fourth current limiting resistor, a first detection resistor, a second detection resistor, a third detection resistor, a third filter capacitor, a fourth filter capacitor, and a second switch element; a third access terminal of the second switch element receives the system power voltage, and is electrically connected with the enable signal detection output terminal through the third current limiting resistor; a second control terminal of the second switch element is electrically connected with the enable signal detection output terminal through the fourth current limiting resistor; a fourth access terminal of the second switch element is electrically connected with the second access terminal through the first detection resistor; one terminal of the second detection resistor is grounded through the third filter capacitor, and another terminal of the second detection resistor is electrically connected with the second access terminal; one terminal of the third detection resistor is grounded through the fourth filter capacitor, and further is electrically connected with the second current receiving terminal; another terminal of the third detection resistor is electrically connected with the fourth access terminal of the second switch element.

6. The electronic cigarette of claim 1, wherein the control chip further comprises at least one indicator light control terminal; each indicator light control terminal is electrically connected with an indicator circuit; the indicator circuit comprises at least one fifth current limiting resistor and at least one LED; a cathode of each LED is electrically connected with one indicator light control terminal through a fifth current limiting resistor, and an anode of each LED receives the system power voltage.

7. The electronic cigarette of claim 1, wherein the first switch element is an airflow sensor; a power terminal of the airflow sensor receives the system voltage; the control signal input terminal of the control chip is electrically connected with a signal output terminal of the airflow sensor through a sixth current limiting resistor, the signal output terminal is grounded through the first ground resistor.

8. The electronic cigarette of claim 7, wherein the control chip further comprises a first power receiving terminal and a first ground terminal; the first power receiving terminal of the control chip receives the system power voltage, and is grounded through a sixth filter capacitor; the first ground terminal is grounded.

9. The electronic cigarette of claim 8, wherein the first control terminal of the step-down switch chip receives the system power voltage through a seventh current limit resistor, the second access terminal of the step-down switch chip is connected with a resistance detection terminal of the control chip through a fourth detection resistor; the resistance detection terminal is connected with a terminal of a divider resistor through the fourth detection resistor, other terminal of the divider resistor is grounded; the second access terminal of the step-down switch chip is grounded through the divider resistor.

10. The electronic cigarette of claim 7, wherein the voltage output circuit further comprises a voltage stabilizing module; a first terminal of the voltage stabilizing module is connected with a voltage output terminal of the control chip through a stabilizing resistor; the first terminal of the stabilizing module is connected with a second terminal of the stabilizing module; the second terminal of the stabilizing module is connected with a high voltage level input terminal of the control chip.

11. The electronic cigarette of claim 1, wherein the electronic cigarette further comprises a chargeable battery; the chargeable battery provides the system power voltage.

12. The electronic cigarette of claim 11, wherein the electronic cigarette further comprises a connector and a charging chip; the charging chip comprises a second power receiving terminal and a charging voltage output terminal; the second power receiving terminal is electrically connected with an external power source through the connector; the charging voltage output terminal outputs a charging voltage to a positive terminal of the chargeable battery.

13. The electronic cigarette of claim 12, wherein the electronic cigarette further comprises a charging protection chip; the charging protection chip comprises a third power receiving terminal, a second ground terminal, a heat dissipation lump terminal, and a charging detection terminal; the third power receiving terminal of the charging protection chip is electrically connected with a positive electrode of the chargeable battery; the second ground terminal of the charging protection chip is electrically connected with a negative electrode of the chargeable battery; the heat dissipation lump terminal of the charging protection chip is electrically connected with the second ground terminal of the charging protection chip; the charging detection terminal of the charging protection chip is grounded.

14. The electronic cigarette of claim 13, wherein the charging circuit further comprises a battery protection chip; the battery protection chip comprises a charging input terminal, a third ground terminal, a fourth ground terminal, a fourth power receiving terminal, and an internal power supply terminal; the charging input terminal is connected with charging voltage output terminal of the charging chip, and is grounded through a seventh filter capacitor for receiving a stable voltage; the third ground terminal and the fourth ground terminal are grounded; the internal power supply terminal is grounded through an eighth capacitor; the fourth power receiving terminal is connected with the positive electrode of the chargeable batter; the negative electrode of the chargeable battery is grounded.

* * * * *